United States Patent
Hänggi

[19]

[11] Patent Number: 6,009,787
[45] Date of Patent: Jan. 4, 2000

[54] PROCESS AND DEVICE FOR PUNCHING HOLES IN FLAT WORKPIECES

[76] Inventor: Eugen Hänggi, Grafenfelsweg 14, Solotburn, Switzerland, CH-4500

[21] Appl. No.: 08/793,608

[22] PCT Filed: Sep. 5, 1995

[86] PCT No.: PCT/CH95/00193

§ 371 Date: Mar. 6, 1997

§ 102(e) Date: Mar. 6, 1997

[87] PCT Pub. No.: WO96/07493

PCT Pub. Date: Mar. 14, 1996

[30] Foreign Application Priority Data

Sep. 7, 1994 [CH] Switzerland .............. 2731/94

[51] Int. Cl.[7] .................. B26F 1/14; B26D 7/02
[52] U.S. Cl. ................. 83/688; 83/420; 83/452; 83/684; 269/63; 269/287
[58] Field of Search .............. 83/688, 684, 452, 83/420, 34, 35, 36; 269/63, 64, 69, 287

[56] References Cited

U.S. PATENT DOCUMENTS

| | | | |
|---|---|---|---|
| 2,265,726 | 12/1941 | Greenberg | 83/36 |
| 3,027,632 | 4/1962 | Baynes et al. | 83/36 |
| 3,706,249 | 12/1972 | Bruckner . | |
| 4,297,927 | 11/1981 | Kuroda | 83/36 |
| 4,373,980 | 2/1983 | Skalmierski et al. | 269/287 |
| 4,491,307 | 1/1985 | Ellefson | 269/287 |
| 4,619,448 | 10/1986 | Leibinger et al. . | |
| 5,005,618 | 4/1991 | Stegherr | 269/63 |
| 5,105,696 | 4/1992 | Baubles | 83/35 |

FOREIGN PATENT DOCUMENTS

| | | |
|---|---|---|
| 1032960 | 7/1953 | France . |
| 64221 | 11/1955 | France . |
| 1055919 | 4/1959 | Germany . |
| 3920701 | 1/1991 | Germany . |
| 404279226 | 10/1992 | Japan ........... 83/684 |

OTHER PUBLICATIONS

A Copy of the Preliminary Examination Report in original German language.
A Partial literal English language translation of the same.
H. Mauri, "Der Vorrichtungsbau", Part I, 1957, pp. 42–43, Fig. 183–184.

*Primary Examiner*—M. Rachuba
*Assistant Examiner*—Sean Pryor
*Attorney, Agent, or Firm*—Greenblum & Bernstein, P.L.C.

[57] ABSTRACT

To manufacture orifice disks, polygonal workpieces are prefabricated and oblique holes are punched successively by positioning the polygonal workpieces in different angular positions between lateral stops on an inclined bearing surface of a fixed punch die. The workpiece is removed after punching a hole, arranged in the following angular position and positioned between the lateral stops in order to punch the following hole. The removal and positioning of the workpiece in different angular positions is repeated to provide the required arrangement of punched holes. A device for manufacturing orifice disks includes a punch, lateral stops, and an inclined bearing surface of a fixed die. Accordingly, the series production of orifice disks of multiple-orifice nozzles for fuel-injection engines is accomplished.

4 Claims, 4 Drawing Sheets

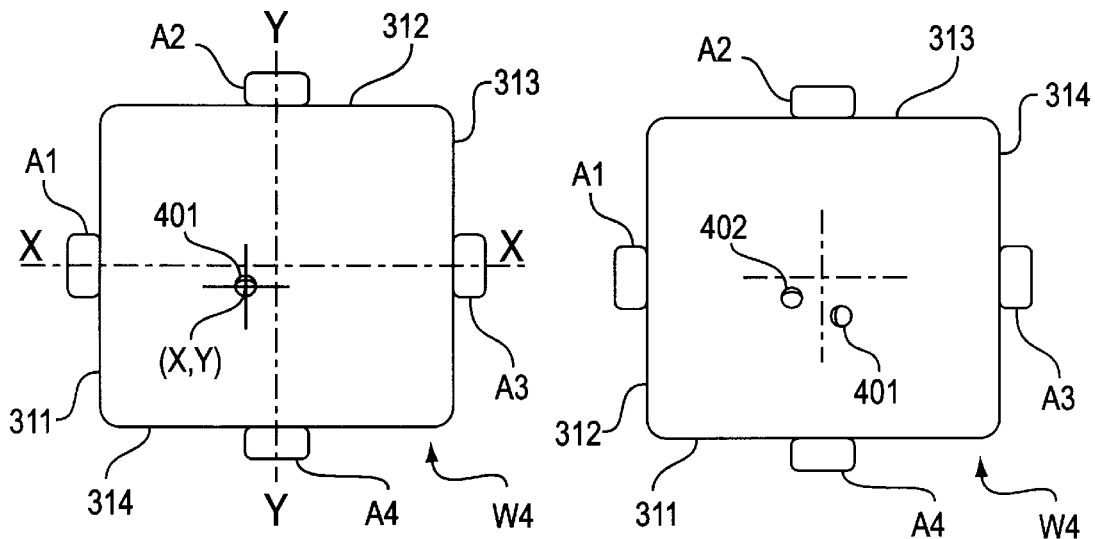
FIG. 4A
FIG. 4B
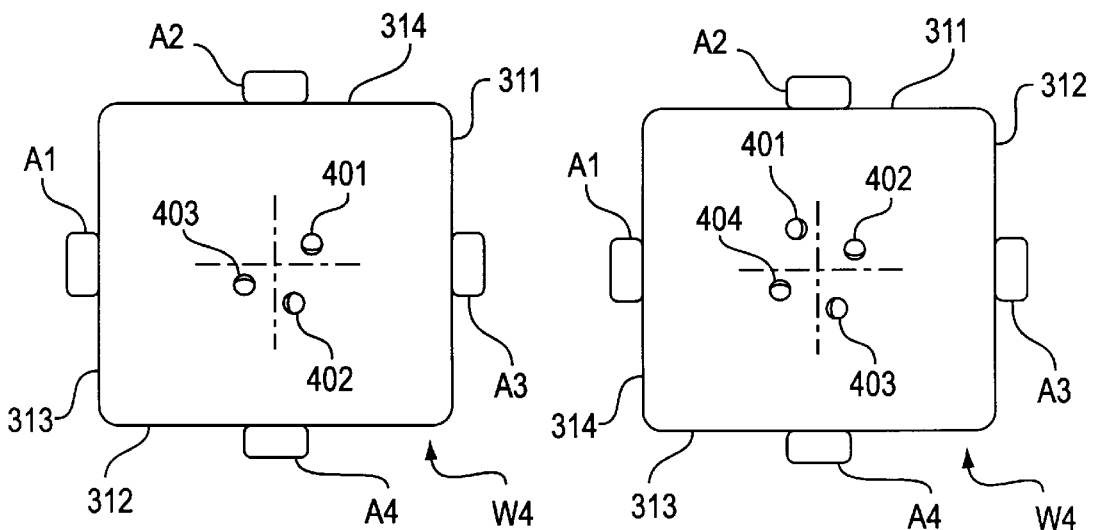
FIG. 4C
FIG. 4D

PROCESS AND DEVICE FOR PUNCHING HOLES IN FLAT WORKPIECES

BACKGROUND OF THE INVENTION

1. Field of the Invention

The present invention relates to a process for punching holes in flat workpieces and a device for carrying out this process. In particular, the present invention relates to a process for manufacturing orifice disks in series for multi-hole fuel-injection nozzles, comprising punching holes successively with a single punch by stepwise angular adjustment of a sheet-metal workpiece.

2. Discussion of Background

Injection valves with orifice disks having perpendicular or oblique holes are increasingly used in car engines and require uniform distribution of the fuel injected into each cylinder of the engine. The series production of such orifice disks requires the punching of identical symmetrically arranged holes and is problematic inasmuch as slight deviations resulting from punching; can impair the uniform distribution of fuel.

The series production of orifice disks for multihole nozzles for use in fuel-injection engines is therefore particularly problematic inasmuch as an extremely high reproducibility of the precision of the quality and the position of each of the holes punched with narrow spacing has to be guaranteed in order to ensure the efficient operation of fuel-injection engines produced in large series.

SUMMARY OF THE INVENTION

The object of the invention is essentially to enable the punching of identical holes with relatively simple technical means in such a manner that the series production of such orifice plates with various symmetrical hole arrangements can be ensured with high precision and reproducibility to ensure the efficient operation of fuel-injection engines.

Accord to the invention all the holes are punched with a single punch, while the workpiece is positioned successively in predetermined angular positions and thereby respectively defines the position of each hole to be punched in the workpiece.

The workpiece is advantageously designed in the form of a polygon which defines the different angular positions for positioning the workpiece with the aid of corresponding lateral stops.

The outer form or contour of the polygonally shaped workpiece performs the function of a template which interacts with the lateral stops in a particularly simple manner so as to position the workpiece in predetermined angular positions according to the invention and to thereby define the position of each hole punched in the workpiece.

The lateral stops are respectively arranged on a fixed die and adapted to the polygonal workpiece so that they enable the selective arrangement of the workpiece in different predetermined angular positions for successively punching holes in corresponding predetermined locations in the workpiece.

Holes extending obliquely to the workpiece surface can moreover be punched by positioning the workpiece on a bearing surface of a die which is inclined accordingly.

Pairs of holes extending parallel to each other can moreover be punched by providing a workpiece with two opposite sides having recesses of different depths, while the lateral stops are caused to act selectively on these recesses in corresponding angular positions of the workpiece.

Such pairs of holes extending parallel to each other may be punched obliquely to the workpiece surface in a simple manner by lateral displacement of the polygonal workpiece with the aid of adjustable or interchangeable stops. The symmetry of the holes punched parallel to each other in relation to the workpiece is ensured by respectively rotating the workpiece to punch symmetrically arranged holes.

The device for carrying out the process according to the invention comprises a single punch and a fixed die with a passage for the punch and a bearing surface for the workpiece as lateral well as stops which exclude any rotation of the polygonal workpiece while punching and define the different angular positions as well as the position of each punched hole.

As a result of the polygonal form of the workpiece according to the invention and the predetermined angular positions in relation to the lateral stops, the coordinates of the desired holes to be punched in each case are defined exactly in the workpiece in a simple manner to thereby ensure maximum reproducibility when punching is effected.

Different symmetrical hole arrangements may thereby be produced in a very simple manner by the stepwise angular adjustment of the workpiece according to the invention.

The workpiece may moreover be subsequently machined to thereby produce, for example, a circular orifice disk with the required diameter.

BRIEF DESCRIPTION OF THE DRAWINGS

The invention will be explained by examples of embodiments which are represented schematically in the figures as follows.

FIGS. 4a to 4d show a variant of the embodiment according to FIGS. 3a to 3d.

Similar elements have the same reference symbols in the figures.

DETAILED DESCRIPTION

The workpiece W6 in FIG. 1 consists of a twelve-sided plate with six long edges 11, 12, 13, 31, 32, 33 and six short sides 21, 22, 23, 41, 42, 43, which are inscribed in a circle and are arranged alternately at the periphery of the workpiece W6 in the following sequence: 11-43-12-21-13-22-31-23-32-41-33-42.

Figure 1:
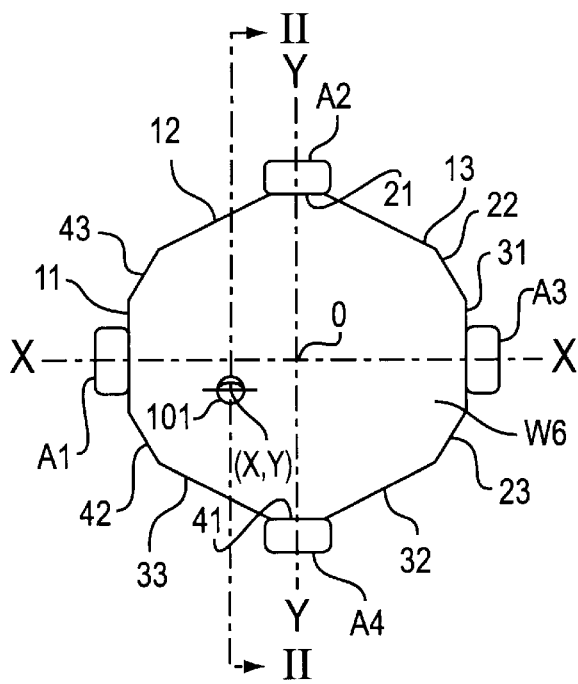
FIG. 1 shows a polygonal workpiece for punching six holes according to one embodiment.

FIG. 1 further shows four lateral stops A1 to A4. The stops A1, A3 and A2, A4 are arranged respectively in contact with the sides 11, 31 and 21, 41 and symmetrically on perpendicular median lines X—X and Y—Y through the center 0 of the workpiece W6.

The stops A1 to A4 thereby define the angular position of the workpiece W6 as well as a coordinate system X-Y through the center 0 of the workpiece W6, while the indicated coordinates x, y determine the position of a hole 101 to be punched.

Figure 2:
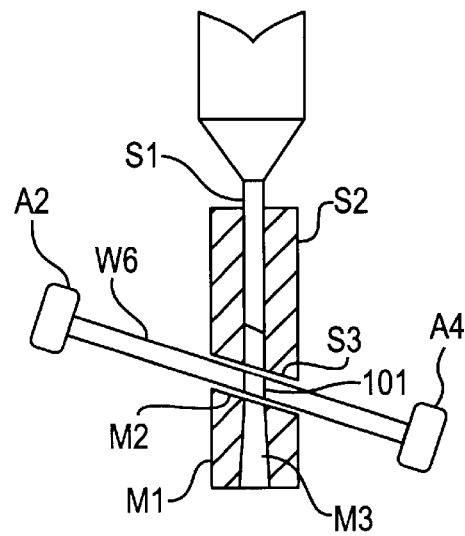
FIG. 2 shows a vertical section of a device for carrying out the process according to the invention, wherein the workpiece is represented in cross-section along the line II—II in FIG. 1.
Figure 1A:
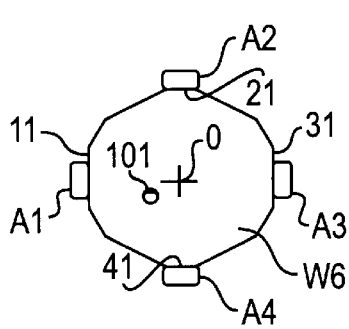
FIGS. 1a to 1f show the workpiece according to FIG. 1 in six angular positions for successfully punching single holes.
Figure 1B:
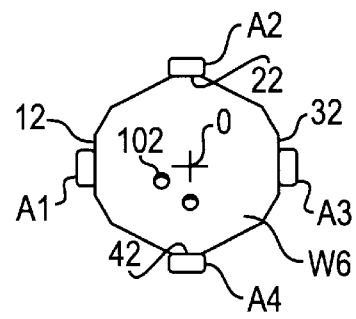
Figure 1C:
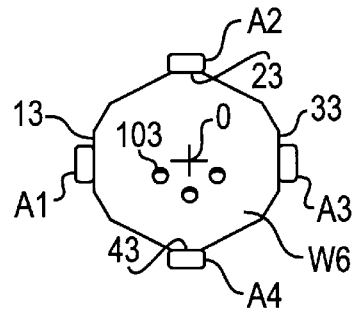
Figure 1D:
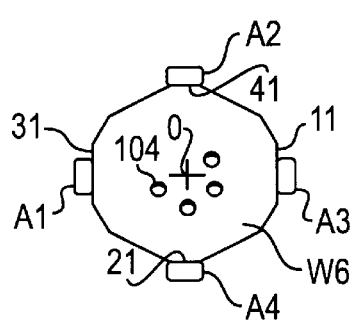
Figure 1E:
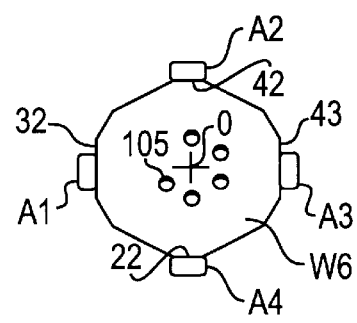
Figure 1F:
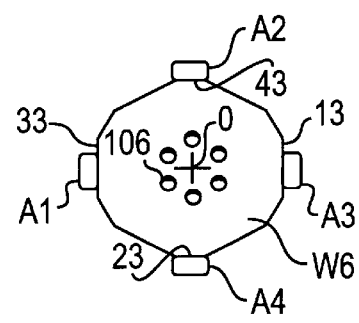
Figure 3A:
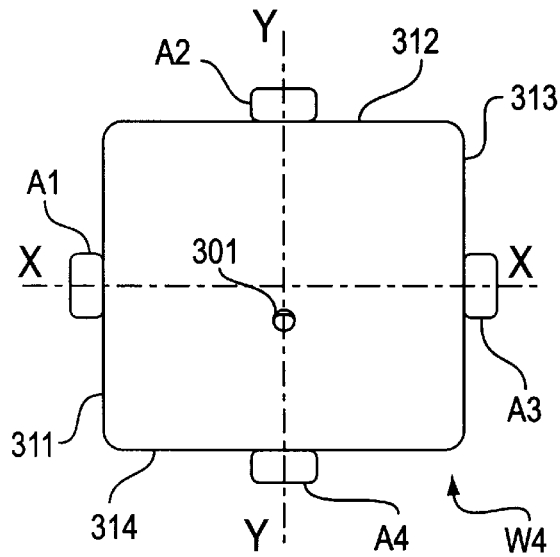
FIGS. 3a to 3d show of a polygonal workpiece for punching four holes according to another embodiment which is represented in four angular positions for successfully punching the individual holes.
Figure 3B:
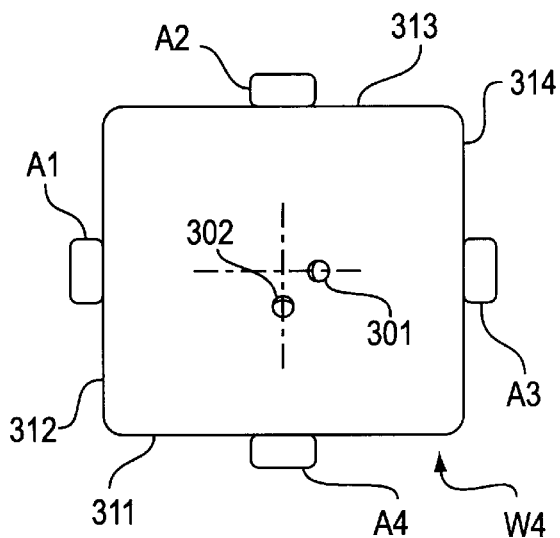
Figure 3C:
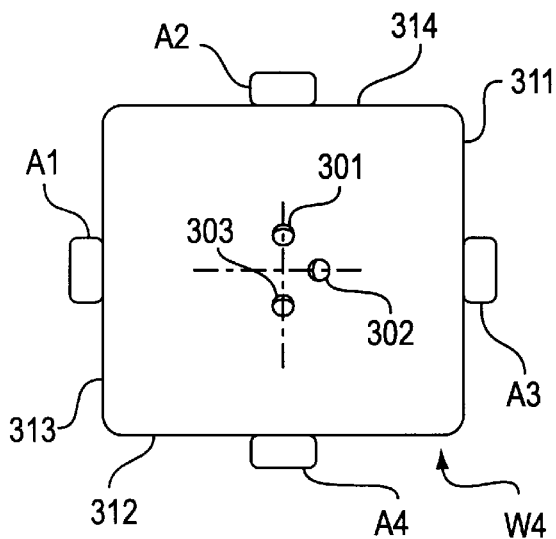
Figure 3D:
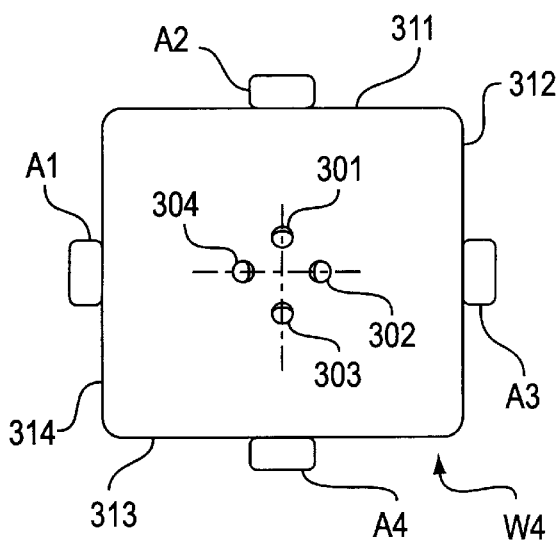

FIG. 2 shows a schematic vertical section along II—II in FIG. 1 of a device for punching oblique holes in accordance with the invention. This device comprises a punch S1, a vertically mobile punch guide S2 with an inclined bottom surface S3, a die M1 with an inclined bearing surface M2 for the workpiece W6 and a vertical passage M3 for the punch S1, as well as the stops A2 and A4 mentioned in connection with FIG. 1. As seen from the figures and from the above, the punch S1 may be a vertical punch.

The bearing surface M2 of the punch die and the bottom surface S3 of the punch guide S2 are moreover inclined at a predetermined angle in relation to the horizontal plane, so that the workpiece W6 is inclined at the same angle and the punched hole 101 is inclined accordingly in the workpiece W6.

The punch guide S2 is shown in FIG. 2 in its lower position, in which the workpiece W6 is arranged obliquely between its bottom surface S3 and the bearing surface M2, while the punch S1 is located in an intermediate position.

The vertically movable punch guide is moreover connected to an adjusting device (not shown) whereby to bring the guide on one hand into its lower working position shown in FIG. 2 and on the other hand into its upper rest position which enables the workpiece to be inserted and removed.

The workpiece is on one hand positioned between the stops A1 to A4 and held between the bearing surface M2 and the bottom surface S3 of the punch guide S2 whereby to provide for punching a hole in the described device according to FIG. 2. The punch guide S2 is on the other hand brought into its upper rest position to allow the workpiece to be inserted to provide for punching, to then be removed, rotated to the next angular position and reinserted to punch the following hole.

The described device according to FIG. 2 serves to punch oblique holes at a predetermined angle to the workpiece, the bearing surface M2 of the die M1 being inclined accordingly.

The described workpiece W6 in FIG. 1 serves to punch six holes which are regularly spaced distributed on a circle around the center 0 of the workpiece W6 and their centers are designated by 101 to 106. The manner of punching these six holes will be further described in connection with FIG. 1a to FIG. 1f.

The position of the punch S1 in relation to the workpiece and hence the center of the holes 101 to 106 to be punched in each case is defined by the stops A1 to A4 at the coordinates x, y of the hole 101 represented in FIG. 1 in the coordinate system X-Y with the center lines through the center 0 of the workpiece W4.

The six holes 101 to 106 are is punched successively and arranged symmetrically as follows from FIGS. 1a to 1f.

It can be seen from the above description that, thanks to the combination provided for in accordance with the invention of the polygonal workpiece W6 with the lateral stops A1 to A4 and with the bearing surface M2 of the die, the workpiece is in each case positioned exactly in the required angular position for punching a given hole, whereby the coordinates x, y of each hole are definitely established and exactly aligned with the axis of the punch, so that identical holes are punched successively in a simple manner merely by stepwise modification of the angular position of the workpiece.

In the further embodiment according to FIGS. 3a to 3d a square workpiece W4 serves to punch four symmetrically arranged holes 301 to 304 which are punched successively in a similar manner as already described in connection with FIGS. 1, 1a to 1d and 2.

The following description of this arrangement is therefore simplified in order to avoid unnecessary repetition and is limited to the differences with regard to the preceding description.

The workpiece W4 shown in FIGS. 3a to 3d consists of a square plate with four sides 311, 312, 313, 314 the opposite stops A1, A3 and A2, A4 are being equally spaced, likewise arranged symmetrically on the center lines X—X and Y—Y of the workpiece W4 and similarly positioning the workpiece.

In the first angular position for punching the hole 301 the four sides 311, 312, 313, 314 of the workpiece are in contact with the four stops A1, A2, A3, A4, while the workpiece is in each case rotated by 90° to the left to punch the four holes 301 to 304 successively as follows from FIGS. 3a to 3d.

The described device in FIG. 2 can serve to punch in like manner the four holes 301 to 304 in the workpiece W4, which is positioned between the stops A1 to A4 on the bearing surface M2 and rotated to the left by 90° in each case, while these holes are successively punched and distributed symmetrically as follows from FIGS. 3a to 3d.

The square workpiece W4 can also serve to punch two holes in a similar way, the workpiece being rotated by 180° after punching the first hole 301 in order to punch the opposite hole 303.

The variant shown in FIGS. 4a to 4d corresponds substantially to the described embodiment according to FIGS. 3a to 3d, the four holes 401 to 404 having in this case the coordinates x, y in the coordinate system X-Y.

FIGS. 5a to 5d show an eight-sided workpiece W54 in four angular positions for punching four holes arranged in pairs of holes respectively extending parallel to each other 501, 503 and 502, 504 respectively according to a further embodiment of the invention.

The workpiece W54 comprises eight sides 511 to 518 with rectangular recesses 511b, 512b, 515b, 516b and is positioned by lateral stops A51a, A52, A53a, A54 and A51b, A52, A53b, A54 respectively in the angular positions in FIGS. 5a, 5b and 5c, 5d, to thereby punch the holes 501 to 504 successively with a single punch.

The opposite edges 511, 515 and 512, 516 of the workpiece W54 are respectively provided with rectangular recesses of unequal depth 511b, 515b and 512b, 516b which selectively interact with the corresponding stops A51a, A53a and A51b, A53b respectively according to FIGS. 5a to 5d.

Figure 5A:
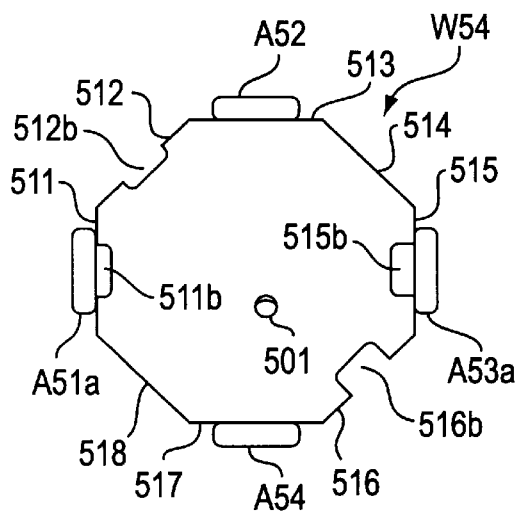
FIGS. 5a to 5d show a workpiece according to another embodiment for punching pairs of parallel holes.

FIG. 5a shows the workpiece W54 in the first angular position for punching the hole 501, the stops A51a, A52, A53a, A54 being respectively associated for this purpose with the sides 511, 513, 515, 517 of the workpiece W54 as follows: A51a/511; A52/513; A53a/515; A54/517.

Figure 5B:
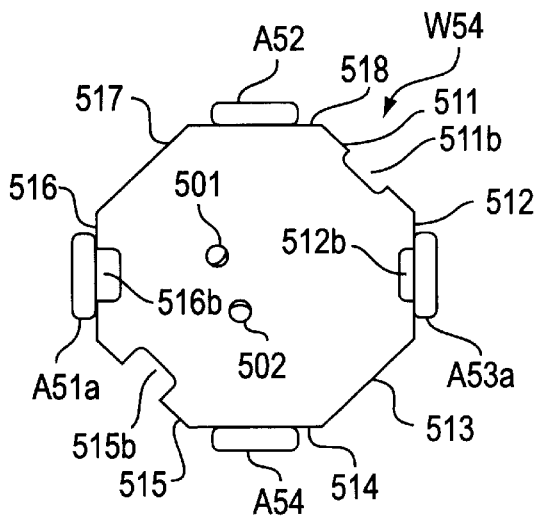

FIG. 5b shows the workpiece W54 in the second angular position for punching the hole 502, the stops A51a, A52, A53a, A54 being respectively associated for this purpose with the sides 516, 518, 512, 514 of the workpiece W54 as follows: A51a/516; A52/518; A53a/512; A54/514.

Figure 5C:
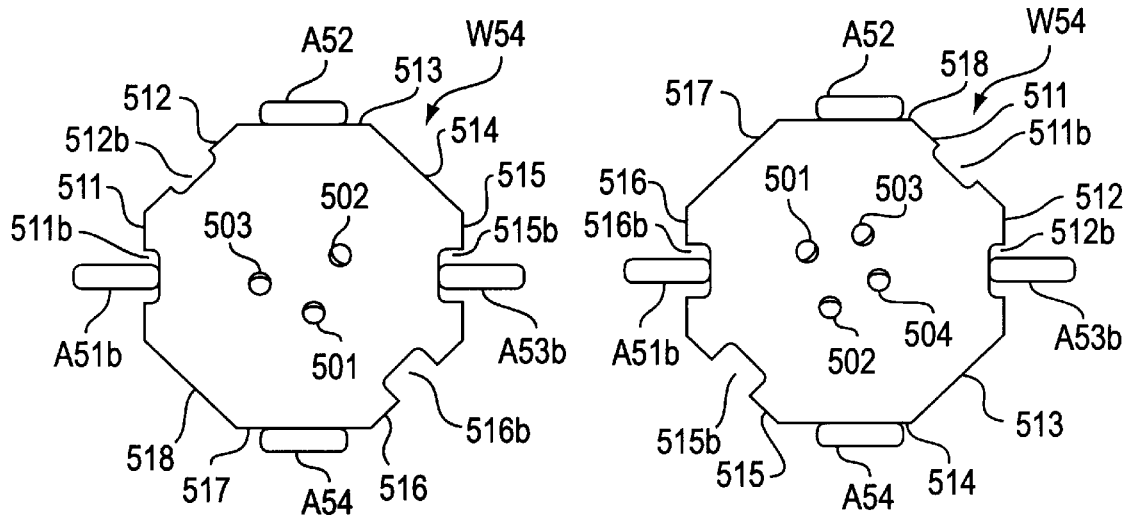

FIG. 5c shows the workpiece W54 in the third angular position for punching the hole 503, the stops A51b, A53b being respectively associated for this purpose with the rectangular recesses 511b, 515b and the stops A52, A54 with the sides 513, 517 of the workpiece W54 as follows: A51*b*/511*b*; A52/513; A53*b*/515*b*; A54/517.

Figure 5D:
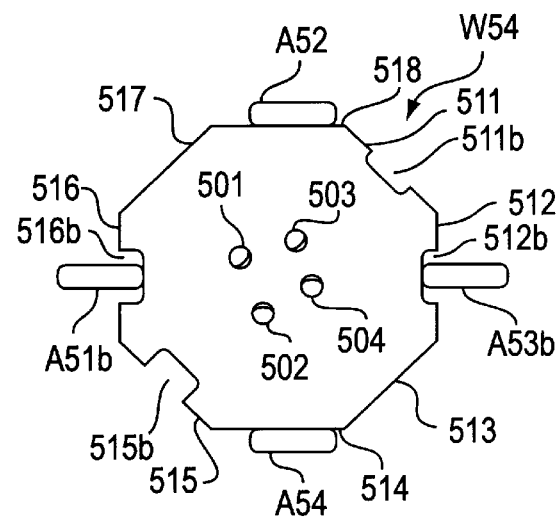

FIG. 5*d* shows the workpiece W54 in the fourth angular position for punching the hole 504, the stops A51*b*, A53 being respectively associated for this purpose with the rectangular recesses 516*b*, 512*b* and the stops A52, A54 respectively with the sides 518, 514 of the workpiece W54 as follows: A51*b*/516*b;* A52/518; A53*b*/512*b*; A54/514.

The stops A52 and A54 thereby serve to position the workpiece W54 in the four described angular positions according to FIGS. 5*a* to 5*d*. The workpiece W54 is positioned respectively by means of the stops A51*a*, A53*a* in the first two angular positions according to FIGS. 5*a* and 5*b* for punching the holes 501 and 502 and by of the stops A51*b*, A53*b* in the two angular positions according to FIGS. 5*c* and 5*d* for punching the holes 503 and 504.

The stops A51*a*, A53*a* are moreover replaced by the stops A51*b*, A53*b* after punching the first two holes 501, 502, in order to punch the next two holes 503, 504.

The described polygonal shape of the workpiece W54 with the recesses of unequal depth 511*b*, 515*b* and 512*b*, 516*b* respectively in combination with the stops A51*a*, A53*a* and A51*b*, A53*b* provides besides the different angular adjustments in FIGS. 5*a* to 5*d*, a linear displacement of the holes 503 and 504 respectively in relation to the holes 501, 502. In this way the hole 503 is punched parallel to the hole 501 and the hole 504 is punched parallel to the hole 502, as may be seen particularly from FIG. 5*d*.

The process according to the invention may also be carried in other ways than in the described embodiments, while other means may also be used for the stepwise angular adjustment for punching the holes successively with a punch in accordance with the invention.

This invention provides a special combination of advantages which may be explained as follows:

(a) Thanks to the stepwise angular adjustment of the workpiece provided in accordance with the invention, the required holes can now be exactly punched with the same punch and uniformly spaced in a simple manner.

(b) Oblique holes may be punched successively in like manner at a given angle to the workpiece, the bearing surface for the workpiece being inclined accordingly.

(c) Polygonal workpieces are in each case positioned exactly in predetermined angular positions by corresponding late stops on the stationary die, so that the position of each hole to be punched is exactly defined on the upper side of the workpiece.

(d) Various combinations of polygonal workpieces with suitable stops make it possible to punch different symmetrical hole arrangements with the same punching device.

(e) Through the combination of the polygonal workpiece with corresponding stops, the coordinates of each hole to be punched in the workpiece can be exactly defined in each case in a particularly simple manner with each angular adjustment of the workpiece.

The invention is particularly adapted to the series production of orifice disks of fuel injection valves, the advantages mentioned above being of special significance in this case with regard to the reproducibility in the production of such orifice disks in large series.

The punching process according to the invention is currently used for the mass production of orifice disks for fuel injection valves with a production of about 10 million orifice disks per year, the following steps being carried out more particularly;

1. Stock verification.
2. Preparation and marking many-sided workpieces.
3. Punching holes and examination of the injection orifices.
4. Finishing and examination of the injection orifice disks.

This process may also be used for punching hole arrangements for other uses, in order to provide similar advantages with regard to the high reproducibility which is ensured thanks to the stepwise angular adjustment using the same punch-die unit according to the invention.

I claim:

1. A process for the mass production of orifice disks for multihole fuel-injection nozzles, comprising:

prefabricating a plurality of sheet-metal workpieces having a polygonal contour which is designed so as to define a plurality of predetermined angular positions for each workpiece on a stationary punch die when a given workpiece of the plurality of workpieces engages lateral stops on the stationary punch die to determine an arrangement of oblique holes in the workpiece; and punching a plurality of oblique holes successively in each of the plurality of workpieces having a polygonal contour with a single punch by stepwise angular adjustment of each of the plurality of workpieces in relation to the punch:

wherein each oblique hole is punched in a given workpiece of the plurality of workpieces by positioning the given workpiece in a predetermined angular position between the lateral stops of the stationary punch die which has an inclined bearing surface, and wherein the angular adjustment of the given workpiece for punching oblique holes successively involves removing the given workpiece from the stationary punch die after punching an oblique hole, rotating the given workpiece, and positioning the given workpiece in another angular position for punching a further oblique hole, and wherein the removal, rotation, and positioning of the given workpiece is repeated until all the oblique holes of a required hole arrangement have been punched such that the given workpiece has a plurality of oblique holes.

2. The process of claim 1, wherein the plurality of workpieces have opposite sides which respectively include recesses of unequal depth, and wherein the stops interact with the recesses to position the given workpiece in different angular positions.

3. A system for the mass production of orifice disks from a plurality of sheet-metal workpieces having a polygonal contour by stepwise angular adjustment of a given workpiece of the plurality of workpieces in relation to a punch, the system comprising:

a plurality of workpieces having a polygonal contour;

a single punch;

a stationary punch die having a passage for the single punch, an inclined bearing surface, and a set of stationary stops which is positioned to conform with the polygonal contour of the plurality of workpieces, the set of stationary stops being offset in relation to the single punch so as to allow a given workpiece of the plurality of workpieces to be positioned in different predetermined angular positions between the set of stationary stops on the inclined bearing surface of the stationary punch die and to thereby allow a plurality of oblique holes to be punched successively in the given workpiece such that the given workpiece has a plurality of oblique holes, with the position of the oblique holes being determined by the contour of the given workpiece; and wherein each of the plurality of workpieces has opposite sides which respectively include recesses of unequal depth, and wherein the set of stationary stops is positioned to be capable of interacting with the recesses to position each of the plurality of workpieces in different angular positions.

4. A punching device for the mass production of orifice disks from a plurality of sheet-metal workpieces having a predetermined polygonal contour by stepwise angular adjustment of a given workpiece of the plurality of workpieces in relation to a single punch, comprising:

a single punch; and a stationary punch die having a single passage vertically aligned with the single punch, the stationary punch die having an inclined bearing surface and a set of spaced lateral stops fixed to the inclined surface of the punch die, the stops being offset such that the given workpiece may be positioned between the stops in different angular positions in relation to the single punch when different sides of the given workpiece are successively positioned in contact with each stop, to allow successive punching of oblique holes in a given arrangement in the given workpiece when the given workpiece is positioned on the inclined bearing surface in the different angular positions in relation to the single punch.

* * * * *

UNITED STATES PATENT AND TRADEMARK OFFICE
CERTIFICATE OF CORRECTION

PATENT NO.    : 6,009,787
DATED         : January 4, 2000
INVENTOR(S)   : E. HÄNGGI It is certified that error appears in the above-identified patent and that said Letters Patent is hereby corrected as shown below:

On the cover of the printed patent, at item [76], Inventor, "Solotburn" should be --Solothurn--.

Signed and Sealed this

Twenty-first Day of November, 2000

Attest:

Q. TODD DICKINSON

*Attesting Officer*    *Director of Patents and Trademarks*